US007009120B2

(12) United States Patent  (10) Patent No.: US 7,009,120 B2
Lee  (45) Date of Patent: Mar. 7, 2006

(54) CALIBRATION DEVICE FOR A HELICAL SPRING SCALE

(75) Inventor: Frank Lee, Taipei (TW)

(73) Assignee: Rayjen International Ltd., Taipei (TW)

( * ) Notice: Subject to any disclaimer, the term of this patent is extended or adjusted under 35 U.S.C. 154(b) by 152 days.

(21) Appl. No.: 10/791,324

(22) Filed: Mar. 1, 2004

(65) Prior Publication Data

US 2005/0189152 A1  Sep. 1, 2005

(51) Int. Cl.
*G01G 3/02* (2006.01)
*G01G 23/01* (2006.01)

(52) U.S. Cl. .................. 177/232; 177/225; 177/233; 73/1.13

(58) Field of Classification Search .............. 73/1.13; 177/225, 230–233
See application file for complete search history.

(56) References Cited

U.S. PATENT DOCUMENTS

| 452,278 A | * | 5/1891 | McIlvane | 177/233 |
| 2,446,720 A | * | 8/1948 | Rominski | 177/131 |
| 3,022,845 A | * | 2/1962 | Provi | 177/230 |
| 4,078,625 A | * | 3/1978 | Loeb | 177/233 |
| 4,785,891 A | * | 11/1988 | Noland | 172/579 |
| 4,964,479 A | * | 10/1990 | Sumida | 177/233 |
| 6,246,017 B1 | * | 6/2001 | Yang | 177/148 |
| 6,649,850 B1 | * | 11/2003 | Strohmeier | 177/232 |

* cited by examiner

*Primary Examiner*—Randy W. Gibson
(74) *Attorney, Agent, or Firm*—J.C. Patents

(57) ABSTRACT

A scale includes a housing, a first pressing element, a second pressing element, an adjusting unit, a spring, a carrying unit and an indicator. The housing includes a graduation provided thereon and has a lower portion. The adjusting unit is secured to the lower portion of the housing and has a first thread. The first pressing element is slidably secured in said housing and has a second thread engaged with the first thread of said adjusting unit. The adjusting unit can be rotated relative to the first pressing element for moving the first pressing element in the housing in the direction where the spring can be compressed. The second pressing element is slidably received in the housing. The spring is received in the housing and between the first and second pressing elements. The carrying unit is suited for carrying an object to be weighed and is engaged with the second pressing element. The indicator is moved in concert with the second pressing element for aligning with the graduation and for indicating the weight of the object.

19 Claims, 5 Drawing Sheets

CALIBRATION DEVICE FOR A HELICAL SPRING SCALE

BACKGROUND OF THE INVENTION

1. Field of Invention

The present invention relates generally to a scale. More particularly, the present invention relates to a portable scale having an adjusting unit that is not disengaged from a tubular housing even though a user arbitrarily rotates the adjusting unit or set the portable scale to zero.

2. Description of Related Art

A related reference disclosing a portable scale can be referred to U.S. Pat. No. 6,246,017 to the same inventor, issued on Jun. 12, 2001. The portable scale includes a spring received in a tubular or longitudinal housing having a graduation or a length indicia beside a slot of the housing. The spring has one end supported on a cap threading with an inner thread at the bottom of the housing and the other end connected to a pressing element secured to a carrying unit extended through the spring and outward the housing. An object to be weighed can be put on a hook of the carrying unit and then the spring is compressed in proportion to the weight of the hooked object. An indicator can be moved in concert with the pressing element for aligning the graduation and for indicating the weight of the object. The portable scale can be set to zero by rotating the cap and the cap can be moved in the housing and in the direction where the spring can be compressed. However, when the cap is rotated, finger flesh of a user may be clipped by the gap between the peripheral lip of the cap and the bottom of the housing, or even the cap may be dropped from the housing.

SUMMARY OF THE INVENTION

Accordingly, the present invention has an objective to provide a portable scale having an adjusting unit that is not disengaged from a tubular housing even though a user arbitrarily rotates the adjusting unit or set the portable scale to zero.

The present invention has another objective to provide a portable scale having a handle with a core made of polypropylene (PP) and a skin made of thermoplastic rubber (TPR). The core made of polypropylene (PP) is covered with the skin made of thermoplastic rubber (TPR) for preventing a hand of a user from slipping over the handle.

To achieve these and other objectives, the present invention provides a scale comprising a housing, a first pressing element, a second pressing element, an adjusting unit, a spring, a carrying unit and an indicator. The housing includes a graduation provided thereon and has a lower portion. The adjusting unit is secured to the lower portion of the housing and has a first thread. The first pressing element is slidely secured in said housing and has a second thread engaged with the first thread of said adjusting unit. The adjusting unit can be rotated relative to the first pressing element for moving the first pressing element in the housing in the direction where the spring can be compressed. The second pressing element is slidably received in the housing. The spring is received in the housing and between the first and second pressing elements. The carrying unit is suited for carrying an object to be weighed and is engaged with the second pressing element. The indicator is moved in concert with the second pressing element for aligning with the graduation and for indicating the weight of the object.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
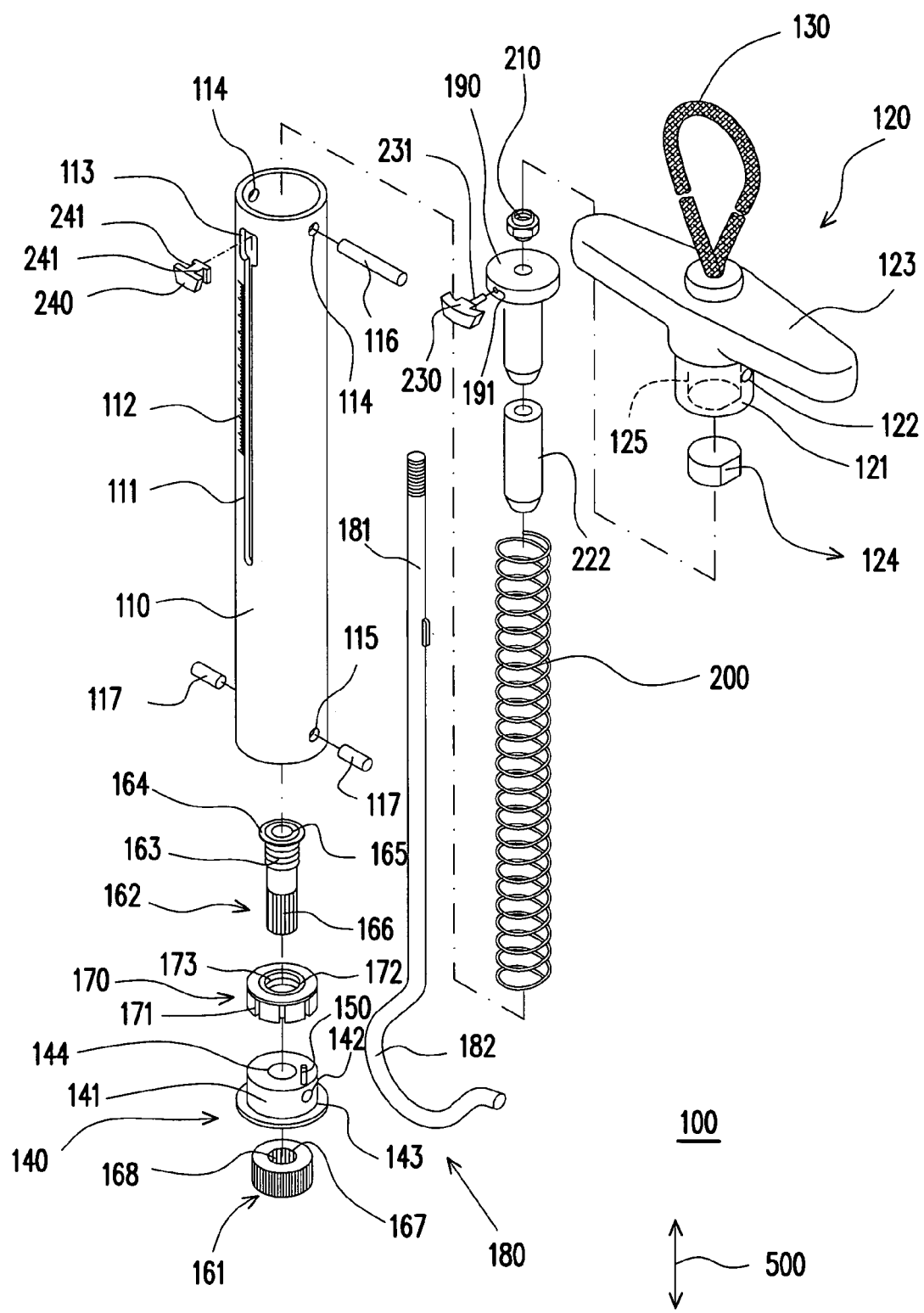
FIG. 1 is a schematic perspective exploded view showing components of a portable scale according to the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
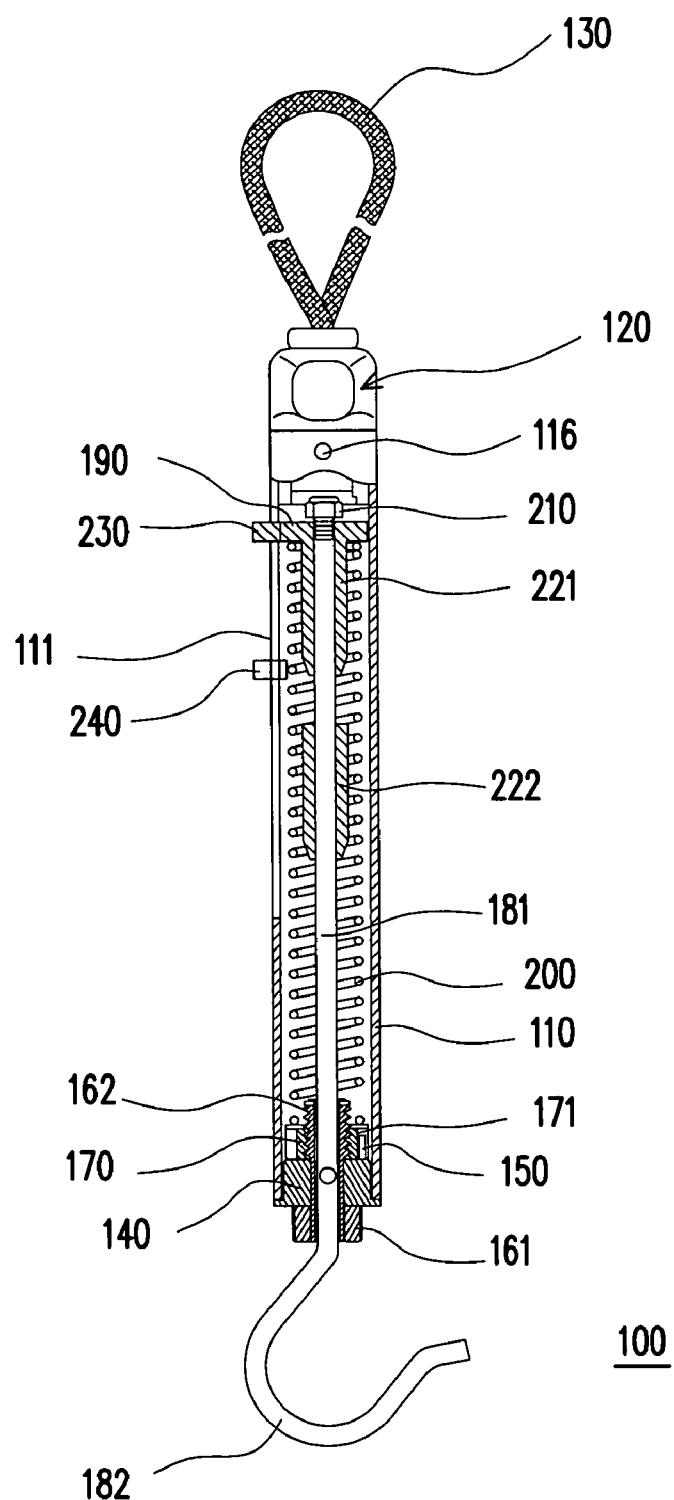
FIGS. 2 and 3 are schematic cross-sectional views showing a portable scale having a screw nut moving to the lower extreme in a linear direction according to the present invention.
Figure 3:
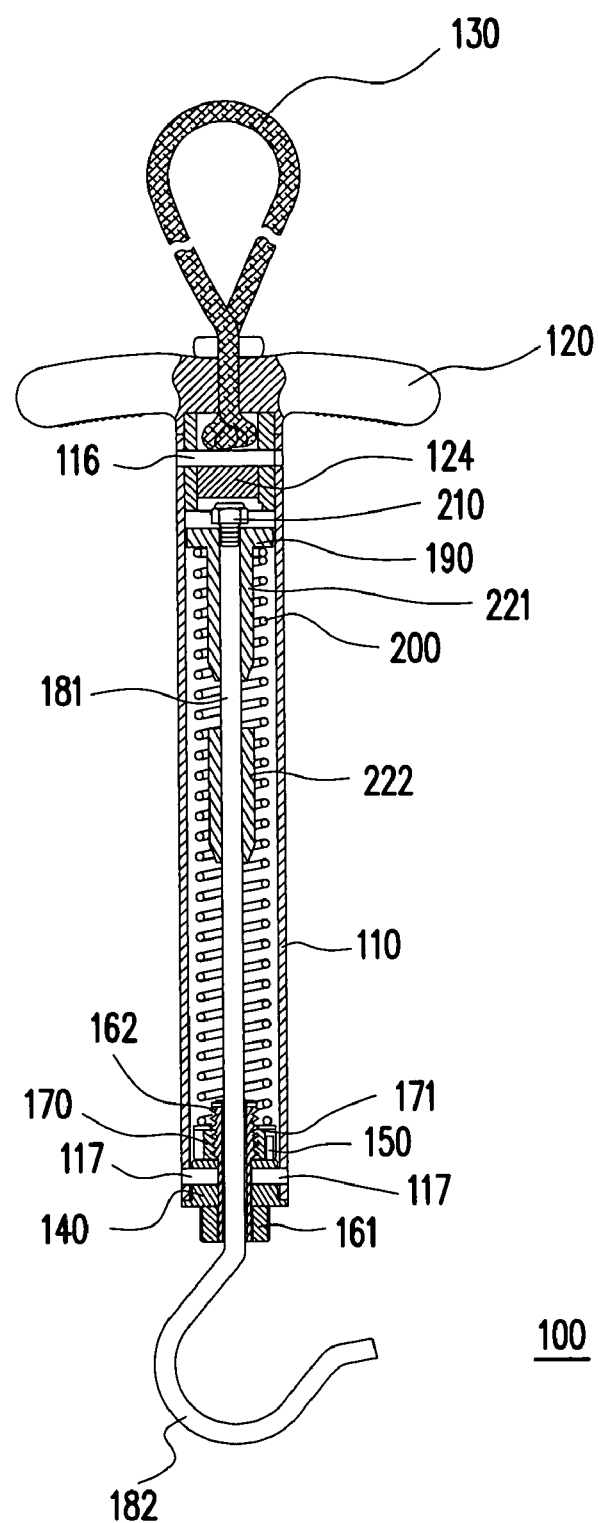
Figure 4:
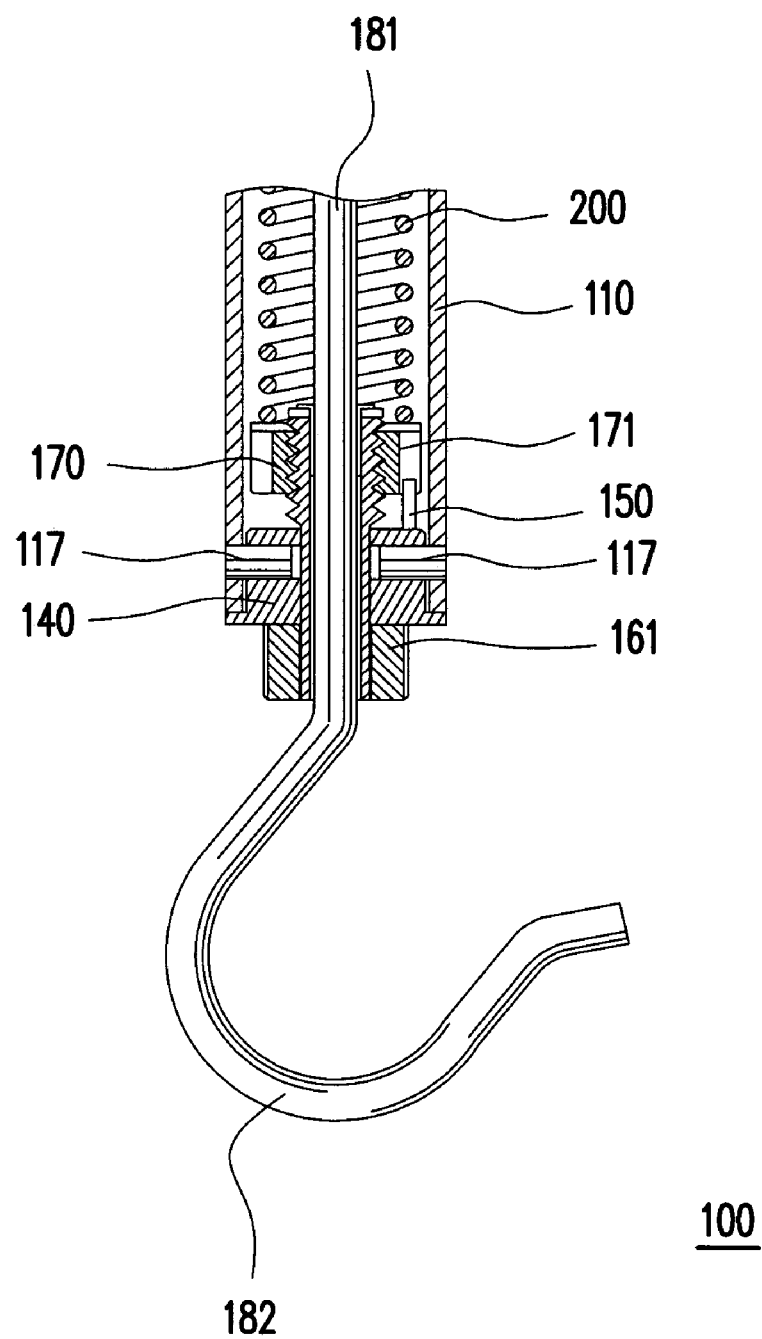
FIG. 4 is a schematic cross-sectional view showing a portable scale having a screw nut moving to the upper extreme in a linear direction according to the present invention.
Figure 5:
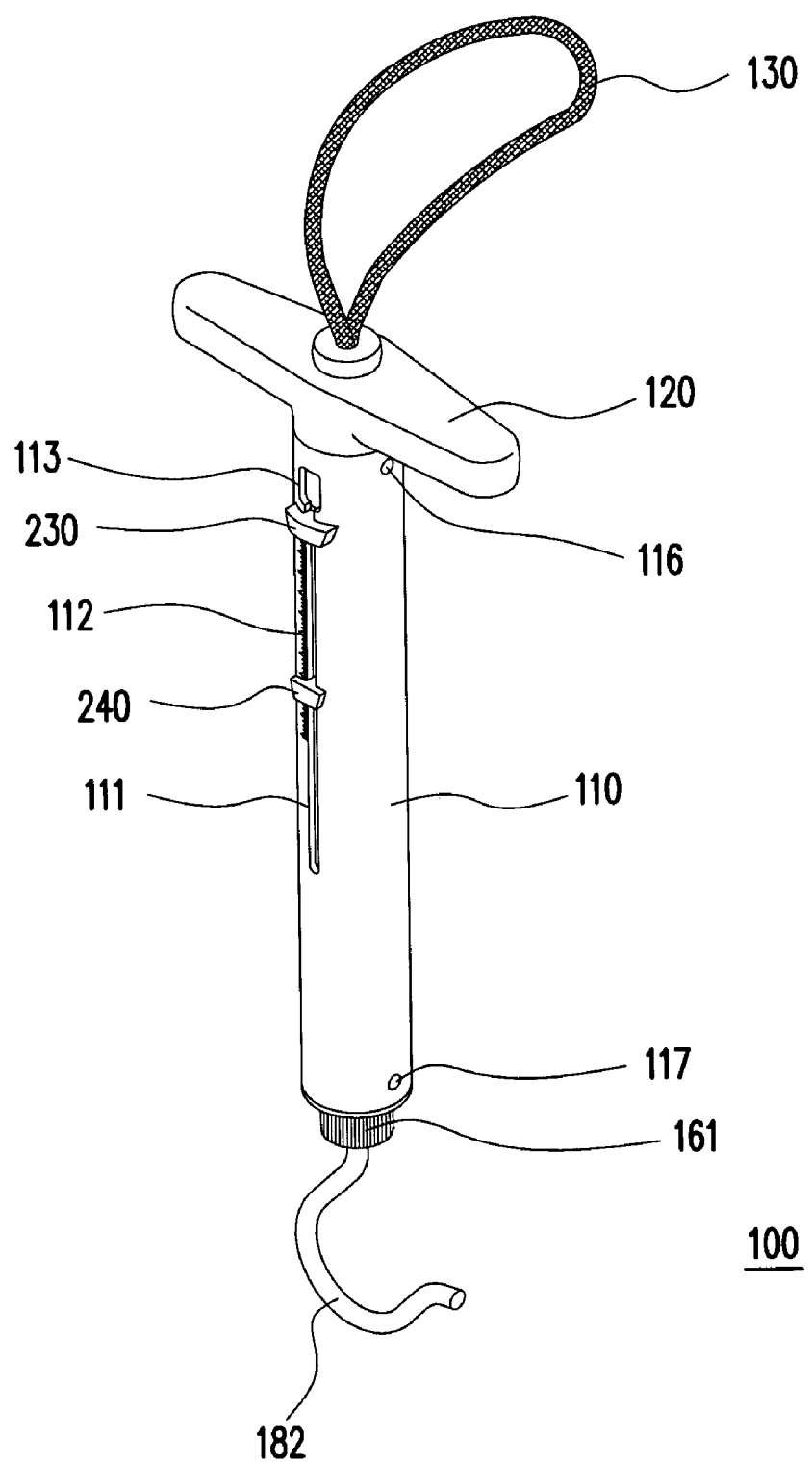
FIG. 5 is a schematic perspective view showing a portable scale according to the present invention.

FIG. 1 is a schematic perspective exploded view showing components of a portable scale according to the present invention. FIGS. 2 and 3 are schematic cross-sectional views showing a portable scale having a screw nut moving to the lower extreme in a linear direction according to the present invention. FIG. 4 is a schematic cross-sectional view showing a portable scale having a screw nut moving to the upper extreme in a linear direction according to the present invention. FIG. 5 is a schematic perspective view showing a portable scale according to the present invention. Referring to FIGS. 1–5, a portable scale 100 in accordance with the present invention comprises a housing 110, such as a tubular or a longitudinal housing 110, including a longitudinal slot 111 formed therein, and including a graduation or a length indicia 112 provided beside the slot 111, and including an opening 113 formed in the upper portion thereof and communicating with the upper end of the slot 111, and including two pairs of opposite holes 116 and 117 formed in the upper and lower portions thereof for receiving bolts 116 and 117, respectively. A handle 120 includes a perpendicular portion 121 having two opposite holes 122 in the sidewall thereof and capable of being inserted into the housing 110. The handle 120 is fixed in the upper portion of the housing 110 by the bolt 116 being extended through the holes 114 of the housing 110 and the holes 122 of the handle 120. The handle 120 includes a horizontal portion 123 connected to the perpendicular portion 121 and engaged outside the housing 110 for hanging purpose. The handle 120 has a core made of polypropylene (PP) and a skin made of thermoplastic rubber (TPR). The core made of PP is covered with the skin made of thermoplastic rubber (TPR) for preventing a hand of a user from slipping over the handle. A sling 130 is engaged on top of the handle 120 whereby a user can carry the scale 100. A stopper 124 is engaged in a hole 125 formed in the perpendicular portion 121 of the handle 120 for constraining the sling 130 from falling into the internal space of the handle 120 and the housing 110.

A cap 140 includes a perpendicular portion 141 having two opposite holes 142 in the sidewall thereof and capable of being inserted into the housing 110, and includes a peripheral lip 143 extended radially outward from the bottom portion thereof, and includes a through hole 144 extended through the center of the cap 140. The cap 140 is fixed in the lower portion of the housing 110 by the bolts 117 being extended through the holes 115 of the housing 110 and the holes 142 of the cap 140. A pin 150 is vertically engaged on top of the cap 140 and projected from the cap 140.

The scale 100 can be set to zero by operating an adjusting unit including a knob 161 and a rod 162. A pressing element 170, such as screw nut 170, can be driven by rotating the adjusting unit 161 and 162. The pressing element 170 is engaged over the cap 140 and has multiple slots 171 for receiving the pin 150. The screw nut 170 has a thread hole 172 extended through the center of the screw nut 170 and aligned with the through hole 144 of the cap 140. The screw nut 170 has an inner thread 173 in the thread hole 172. The rod 162 is extended through the through hole 144 of the cap 140 and the thread hole 172 of the screw nut 170. The rod 162 has an outer thread 163 engaged with the inner thread 173 of the screw nut 170. The rod 162 has a peripheral lip 164 extended radially outward from the upper portion thereof for preventing the screw nut 170 from being disengaged from the rod 162. The rod 162 has a through hole 165 extended through the center of the rod 162 for receiving a shaft 181 of a carrying unit 180. The rod 162 has an engaging part 165 capable of being extended through a center hole 167 of the knob 161 and engaged with the other engaging part 168 in the center hole 167 thereof. When a user rotates the knob 161, the rod 162 secured on the knob 161 can be simultaneously rotated.

The screw nut 170 can not be rotated relative to the cap 140 because the pin 150 fixed on the cap 150 is received in one of the slots 171 of the screw nut 170, but can be moved in the direction 500 where the pin 150 and the rod 162 are extended, by rotating the adjusting unit including the knob 161 and the rod 162, the rod 162 capable of being rotated relative to the screw nut 170. It is to be noted that multiple pins 150 also can be vertically engaged on top of the cap 140 and protruded from the cap 140 and the slots 171 of the screw nut 170 can receives the pins 150.

A pressing element 190 is slidably engaged in the housing 110. A spring 200 is engaged in the housing 110 and between the pressing elements 170 and 190. The spring 200 can be compressed by the pressing elements 170 and 190. A carrying unit 180 has a shaft 180 extended through the through hole 165 of the rod 162 and the center of the spring 200 and has a carrying portion 182, such as hook 182, connected to the shaft 181. The shaft 181 has an upper end extended through the center of the pressing element 190 and engaged with a fastener nut 210. In the embodiment, the pressing element 190 is not required to be secured to the shaft 181 of the carrying unit 180, but may be biased by the fastener nut 210 that is secured on the upper end of the shaft 181 by a thread structure. Or, the upper end of the shaft 181 can be directly secured to the pressing element 190 when required. When an object to be weighed is hanged on the hook 182, the spring 200 can be compressed by the pressing elements 170 and 190 in proportion to the weight of the hooked object. A stem 221 secured on the pressing element 190 and another stem 222 secured on the shaft 181 of the carrying unit 180 are engaged in the spring 200 for straightening the spring 200.

An indicator 230 has a leg or projection 231 engaged into a hole 191 that is formed in the pressing element 190, and is slidably engaged in the slot 111 of the housing 110 for aligning with the graduation 112 and for indicating the position of the pressing element 190 relative to the graduation 112 when the pressing element 190 is pulled downward against the spring 200 by the carrying unit 180. A follower 240 is slidably engaged in the slot 111 of the housing 110 and includes a pair of opposite notches 241 formed therein for receiving the wall of the housing 110. The follower 240 is force-fitted onto the housing 110 for allowing the follower 240 to be slided along the slot 111 of the housing 110. The follower 240 can be engaged in the slot 111 via the opening 113 of the housing 110. When an object to be weighed is hooked to the book 182, the follower 240 is moved downward along the slot 111 of the housing 110 by the pressing element 190 against the spring 200. Either or both of the indicator 230 and the follower 240 can be aligned with the indicia 112 for indicating the weight of the object. When the object is disengaged from the hook 182, the indicator 230 and the pressing element 190 can be biased away from the cap 140 backward to the original position. The follower 240 stays at the position and will not be moved relative to the housing 110 without any external force, such that the user may easily read the weight of the object even when the object has been removed from the scale 100. After weighing operation, the follower 240 may be moved backward to engage with the indicator 230 again for further use.

It is to be noted that, without the indicator 230, the indicator 230 may also be moved by the pressing element 190 directly. Or, without the indicator 230 and the follower 240, the pressing element 190 itself may be aligned with the graduation 112 for indicating the weight of the object.

Accordingly, when the scale 100 is set to zero, a user will rotate the knob 161 such that the screw nut 170 is moved in the direction 500 where the rod 162 is extended until the indicator 230 is aligned with the original point. The screw nut 170 can be linearly moved between the top of the cap 140 and the peripheral lip 164 of the rod 162. Therefore, the cap 140, screw nut 170 and adjusting unit 161 and 162 will not be disengaged from the housing 110 even though a user arbitrarily rotates the knob 161.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scale comprising:
a housing including a graduation provided thereon and having a lower portion;
a cap engaged on said lower portion of said housing, wherein said cap can not be rotated relative to said housing;
a protrusion fixed on said cap and projecting from said cap, wherein said first pressing element includes a receiving vacancy accommodating said protrusion such that said first pressing element can not be rotated relative to said cap;
a first pressing element having an inner thread and engaged over said cap;

an adjusting unit secured to said lower portion of said housing and including a rod and a knob, said rod having an external thread, said rod engaged on said knob and extended through said first pressing element and said cap, said knob engaged below said cap, wherein said external thread of said rod is engaged with said internal thread of said first pressing element such that said rod can be rotated relative to said first pressing element and said first pressing element can be moved in the direction where said rod is extended and where said spring can be compressed;

a second pressing element slidably received in said housing;

a spring received in said housing and between said first and second pressing elements;

a carrying unit including a shaft having an end mounted on said second pressing element, and including a carrying portion suited for carrying an object to be weighed and connected to the other end of said shaft, wherein said shaft is engaged through said spring and extended through said rod and said knob and said carrying portion is engaged below said knob; and an indicator moved in concert with said second pressing element for aligning with said graduation and for indicating the weight of said object.

2. The scale according to claim 1 further comprising a sling engaged on an upper portion of said housing.

3. The scale according to claim 1 further comprising a handle engaged on an upper portion of said housing.

4. The scale according to claim 3, wherein the material constructing said handle comprises polypropylene (PP) and thermoplastic rubber (TPR).

5. The scale according to claim 1, wherein said housing includes a slot formed therein and said graduation is provided beside said slot, said indicator slidably engaged in said slot.

6. The scale according to claim 5 further comprising a follower slidably engaged in said slot of said housing, wherein said follower can be moved along said slot of said housing by said indicator.

7. The scale according to claim 1, wherein said carrying portion comprises a hook.

8. The scale according to claim 1 comprising at least a bolt extended through a wall of said housing and said cap for engaging said cap on said lower portion of said housing.

9. The scale according to claim 1 comprising a stem connected to said second pressing element and engaged in said spring for straightening said spring.

10. A scale comprising:

a housing including a graduation provided thereon and having a lower portion;

an adjusting unit secured to said lower portion of said housing and having a first thread;

a first pressing element slidely secured in said housing and having a second thread engaged with said first thread of said adjusting unit, wherein said adjusting unit can be rotated relative to said first pressing element for moving said first pressing element in said housing in the direction where said spring can be compressed;

a second pressing element slidably received in said housing;

a spring received in said housing and between said first and second pressing elements;

a carrying unit suited for carrying an object to be weighed and engaged with said second pressing element; and an indicator moved in concert with said second pressing element for aligning with said graduation and for indicating the weight of said object.

11. The scale according to claim 10 further comprising a cap engaged on said lower portion of said housing and a protrusion fixed on said cap and projecting from said cap, wherein said first pressing element has a receiving vacancy accommodating said protrusion such that said first pressing element can not be rotated relative to said cap.

12. The scale according to claim 11 comprising at least a bolt extended through a wall of said housing and said cap for engaging said cap on said lower portion of said housing.

13. The scale according to claim 10 further comprising a sling engaged on an upper portion of said housing.

14. The scale according to claim 10 further comprising a handle engaged on an upper portion of said housing.

15. The scale according to claim 14, wherein the material constructing the handle comprises polypropylene (PP) and thermoplastic rubber (TPR).

16. The scale according to claim 10, wherein said housing includes a slot formed therein and said graduation is provided beside said slot, said indicator slidably engaged in said slot.

17. The scale according to claim 16 further comprising a follower slidably engaged in said slot of said housing, wherein said follower can be moved along said slot of said housing by said indicator.

18. The scale according to claim 10, wherein said carrying unit comprises a hook at lower portion thereof.

19. The scale according to claim 10 comprising a stem connected to said second pressing element and engaged in said spring for straightening said spring.

* * * * *